United States Patent
Jesnitzer et al.

[15] 3,679,865
[45] July 25, 1972

[54] APPARATUS FOR CONTROLLING ELECTRIC WELDING PROCESSES

[72] Inventors: Friedrich Erdmann Jesnitzer, Linden; Dietrich Rehfeldt, Vinnhorst, both of Germany

[73] Assignee: Redemat S.A., Luxembourg-Ville, Luxembourg

[22] Filed: June 18, 1971

[21] Appl. No.: 154,633

Related U.S. Application Data

[63] Continuation of Ser. No. 859,161, Sept. 18, 1969, abandoned.

[30] Foreign Application Priority Data

April 15, 1969 Germany .................. P 19 19 034.2

[52] U.S. Cl. ......................................................... 219/131 R
[51] Int. Cl. ................................................................ B23k 9/10
[58] Field of Search ........................... 219/130, 131, 108, 109

[56] References Cited

UNITED STATES PATENTS

| | | | |
|---|---|---|---|
| 3,250,894 | 5/1966 | Manz | 219/131 |
| 3,271,558 | 9/1966 | Davis | 219/131 |
| 3,449,544 | 6/1969 | Needham | 219/131 |
| 3,459,920 | 8/1969 | Sevenco | 219/137 X |

*Primary Examiner*—C. L. Albritton

[57] ABSTRACT

An apparatus for controlling electric welding processes with consumable electrodes by generating electric pulses of the variation in the welding parameters, the voltage, current or mechanical vibration, in the workpiece. These variations which are characteristic for the melting during welding are picked up, transformed and supplied to a signaling device to furnish a statement on the transfer of the material which the welder uses to correctly guide the electrode.

9 Claims, 2 Drawing Figures

PATENTED JUL 25 1972 3,679,865

APPARATUS FOR CONTROLLING ELECTRIC WELDING PROCESSES

This is a continuation of application Ser. No. 859,161, filed Sept. 18, 1969, now abandoned.

This invention relates to an apparatus for controlling electric welding processes. When bare wire and clad electrodes are used in these processes with consumable electrodes as well as electrodes which are formed as core wire electrodes, it has been found that the transfer of the material in the melting-off of these electrodes takes place in a characteristic mode—depending on the welding current, the arc voltage and on the spacing between the end of the electrode and the weld—in the form of drops or spray, or by way of a short circuit formation. Due to this transfer of material, the welding voltage shows characteristic voltage variations which furnish a statement on the transfer of material per unit of time.

One type of electrodes thus shows a spray-like transfer of the fluidized core wire toward the welding bath. An other type of electrode passes into the welding bath in the form of coarse drops of different size with or without short circuit formation.

The discontinuous transfer is practically always accompanied accoustically by certain noises which are characteristic for the type of electrode and the selected welding data. By means of these noises it becomes possible to the welder to determine roughly whether the electrode melts down properly and if thus a correct welding seam is produced.

A further aid in evaluating the correct transfer of material in electric welding consists in observing the common integrating ampere meters and volt meters mounted on the welding generator or on the welding machine, which indicate the average welding current or the average welding voltage, and to guide the welding electrode in such a manner that predetermined values are maintained.

The supervision of the noise which arises during the transfer of the material necessitates a well trained welder, who due to his subjective sensitiveness, is not able to produce a 100 percent satisfactory welding seam. Since the process is tied to a person a longer training period is necessary and permits between individuals in spite of great ability substantially varying results. The reading of the ampere meters and volt meters would permit per se more objective results, but the inertia of these instruments, due to the possibility of indication, is relatively high and thus does not allow to recognize slight variations of the welding parameters, so that still a considerable amount of defects can arise in the welding seam due to variations of the welding parameters from the nominal value.

The object of the present invention is to provide an apparatus or device by means of which the mentioned disadvantages of the prior art are overcome, and which enables the welder to furnish a higher quality welding seam by simple means due to a much better adherence to the welding parameters.

According to the invention, the problem is solved by providing a transducer which detects the variations of a welding characteristic produced by the discontinuous transfer of the material, an electronic pulse shaper connected to the transducer and a signaling device connected to the pulse shaper. In connection with this invention a welding characteristic means either the welding voltage, the welding current or the sound pressure produced by the discontinuous transfer of the material.

Figure 1:
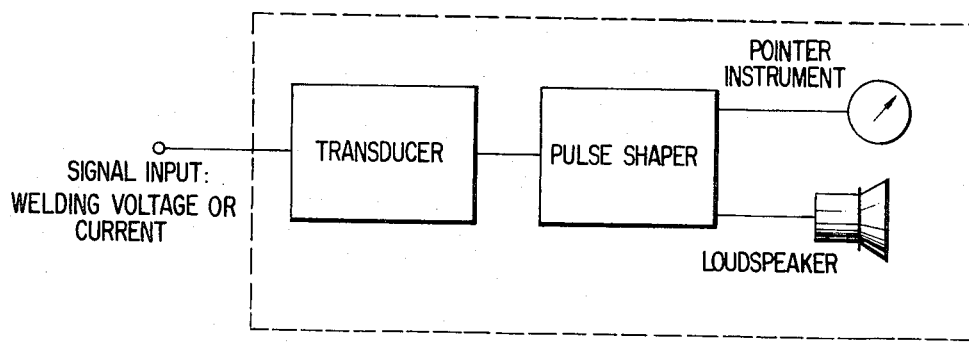
FIG. 1 is a schematic of one embodiment of the invention wherein the signal input is the welding voltage or current.
Figure 2:
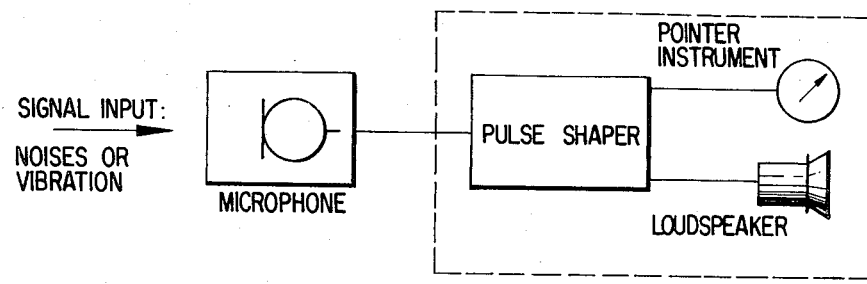
FIG. 2 is another embodiment of the invention wherein the signal input is the welding noise or vibration.

In one series of embodiments according to the invention the pulse shaper transduces and amplifies the variations of the welding current or of the welding voltage (FIG. 1) or the sound pressure (FIG. 2) into pulses lying within the range of audibility, and that these amplified pulses are transmitted to the signaling device, i.e., a loudspeaker or a headset, and are made audible.

These noises represent thus an analogy to the discontinuous current and/or voltage-time course, and an audible noise or sound effect results which extends analogous or offset in time to the discontinuous transfer of the material.

The noise is to be used as a control of the melting characteristics of a rod or a wire electrode in order to enable the welder to control the melting-off characteristics by comparing accoustic effects known to the welder and mentally recorded by him in order to effect a control simultaneously in a subjective manner by varying the welding data and/or the electrode guide.

In an other series of embodiments of the invention the pulse shaper consists of an integrater circuit, the output of which is connected to a pointer instrument used as a signaling device. The indication of the instrument thus optically represents the discontinuous transfer of the material analogous or offset in time.

As explained herein above, the welding voltage or the welding current variations which are analogous in time to the discontinuous transfer of the drops may be the welding characteristic and can be used as input quantity for the transducer, but the transfer of the drops can also be recorded by means of a mechanically suitably coupled sensitive contact microphone which furnishes an output quantity as an electric voltage variation as a function of time, analogous to the sound pressure time curve. In the first two cases the voltage or current variation is sensed by transducers well known in the art and which do not form part of the present invention. In the third case the contact microphone represents the transducer and the sound is the input quantity for the transducer. In voltage dependent operation the transducers may be either a voltage divider or a transformer, and in current dependent operation it may be a shunt or a current transformer. The contact microphone may be replaced by an acceleration pick-up.

If for specific materials, electrodes and welding parameters the deflections of the indicating instrument are known, the electrode can be guided optimally during welding by comparing the needle deflection with these values.

Preferably the instrument dial can be multicolored with respect to the particular welding requirements, wherein the various colors represent the ranges of optimal welding parameters.

The accoustically working device as well as the optically working device can be easily set into the welding pliers in case of manual electrode welding or into a torch in shielded arc welding so that the welder can guide the electrode by means of the accoustical and optical impression.

It is also possible to secure both devices on the welding generator and to allow thereby an accoustical and optical control of the welding process.

In the same manner both devices can be secured together or separately on a welding machine.

We claim:

1. Apparatus for continuously monitoring electric welding processes with consumable electrodes of electrode material, comprising a transducer means responding to variations of a welding characteristic produced by the discontinuous transfer of electrode material and generating at an output electric signals commensurate therewith, an electronic pulse shaping means having an input connected to the output of the transducer transforming the signals into a form suitable for application to a signalling device, and a signalling device connected to the output of the pulse shaping means which continuously produces an intelligible indication of signals at the output of the transducer.

2. The apparatus of claim 1, wherein said welding characteristic is the welding voltage.

3. The apparatus of claim 1, wherein said welding characteristic is the welding current.

4. The apparatus of claim 1, wherein said welding characteristic is the audible sound pressure.

5. The apparatus of claim 1, wherein said pulse shaping means transforms and amplifies the variations of the welding characteristic to generate pulses lying within the range of audibility, and said signalling device is a loudspeaker.

6. The apparatus of claim 1, wherein said pulse shaping means transforms and amplifies the variations of the welding characteristic to generate pulses lying within the range of audibility, and said signalling device is a headset.

7. The apparatus of claim 1, wherein said pulse shaping means is an integrator, and said signalling device is a pointer instrument.

8. The apparatus of claim 1, wherein said pulse shaping means is an integrator, and said signalling device is an optical signalling means.

9. The apparatus of claim 1, wherein said pulse shaping means is an integrator, and said signalling device is a mechanical signalling means.

* * * * *